(12) United States Patent
Le Goff et al.

(10) Patent No.: US 8,959,274 B2
(45) Date of Patent: Feb. 17, 2015

(54) PROVIDING A SERIAL DOWNLOAD PATH TO DEVICES

(75) Inventors: David Le Goff, Tinteniac (FR); Pascal Blouin, Domloup (FR); Eric Mauger, Liffre (FR)

(73) Assignee: Silicon Laboratories Inc., Austin, TX (US)

( * ) Notice: Subject to any disclaimer, the term of this patent is extended or adjusted under 35 U.S.C. 154(b) by 291 days.

(21) Appl. No.: 13/605,242

(22) Filed: Sep. 6, 2012

(65) Prior Publication Data

US 2014/0063343 A1    Mar. 6, 2014

(51) Int. Cl.
*G06F 13/00* (2006.01)
*G06F 13/40* (2006.01)
*G06F 13/364* (2006.01)

(52) U.S. Cl.
CPC .......... *G06F 13/4022* (2013.01); *G06F 13/364* (2013.01)
USPC .......................................... 710/316; 710/110

(58) Field of Classification Search
USPC .................. 710/305–317, 104–110
See application file for complete search history.

(56) References Cited

U.S. PATENT DOCUMENTS

| | | | |
|---|---|---|---|
| 5,535,220 A | 7/1996 | Kanno et al. | |
| 5,754,252 A | 5/1998 | Kuhn et al. | |
| 5,878,234 A * | 3/1999 | Dutkiewicz et al. | 710/110 |
| 6,128,043 A | 10/2000 | Tulder | |
| 6,542,203 B1 | 4/2003 | Shadwell et al. | |
| 6,625,234 B1 | 9/2003 | Cui et al. | |
| 6,630,964 B2 | 10/2003 | Burns et al. | |
| 6,721,908 B1 | 4/2004 | Kim et al. | |
| 6,862,325 B2 | 3/2005 | Gay-Bellile et al. | |
| 7,170,849 B1 | 1/2007 | Arivoli et al. | |
| 7,265,792 B2 | 9/2007 | Favrat et al. | |
| 7,369,835 B2 | 5/2008 | Margairas et al. | |
| 7,426,240 B2 | 9/2008 | Peron | |
| 7,440,392 B2 | 10/2008 | Hwang | |
| 7,490,187 B2 * | 2/2009 | Moll et al. | 710/313 |
| 8,228,431 B2 | 7/2012 | Gao | |
| 8,237,869 B2 | 8/2012 | Blouin et al. | |
| 2002/0085648 A1 | 7/2002 | Burns et al. | |
| 2004/0123226 A1 | 6/2004 | Lee et al. | |

(Continued)

FOREIGN PATENT DOCUMENTS

| | | |
|---|---|---|
| WO | WO 03067877 | 8/2003 |
| WO | WO 2007001305 | 1/2007 |

OTHER PUBLICATIONS

Ahmad Darabiha, "Power Reduction Techniques for LDPC Decoders," pp. 1-10.

(Continued)

*Primary Examiner* — Raymond Phan
(74) *Attorney, Agent, or Firm* — Trop, Pruner & Hu, P.C.

(57) ABSTRACT

In one embodiment, an interface may include various mechanisms to handle incoming clock and data signals. More specifically, the interface includes a first multiplexer to receive a first data signal via a serial peripheral interface (SPI) bus coupled to a first pin and a second multiplexer to receive a first clock signal via the SPI bus coupled to a second pin of the first IC and a second clock signal via an inter-integrated circuit ($I^2C$) bus coupled to a third pin. In addition, the interface may include a decoder to receive the second clock signal and a second data signal via the $I^2C$ bus coupled to a fourth pin.

24 Claims, 6 Drawing Sheets

(56) References Cited

U.S. PATENT DOCUMENTS

| | | |
|---|---|---|
| 2005/0265486 A1 | 12/2005 | Crawley |
| 2006/0206778 A1 | 9/2006 | Wehn et al. |
| 2006/0222115 A1 | 10/2006 | Dornbusch |
| 2008/0086671 A1 | 4/2008 | Garg et al. |
| 2009/0094470 A1 | 4/2009 | Gao et al. |
| 2009/0213275 A1 | 8/2009 | Trager |
| 2009/0300243 A1* | 12/2009 | Chao ................................ 710/71 |
| 2010/0130153 A1 | 5/2010 | Poorfard et al. |
| 2010/0306443 A1* | 12/2010 | Lin et al. ........................ 710/313 |
| 2010/0328536 A1 | 12/2010 | Hendrickson et al. |
| 2010/0328544 A1 | 12/2010 | Hendrickson et al. |
| 2011/0161545 A1* | 6/2011 | Chang et al. ................... 710/305 |
| 2011/0246849 A1 | 10/2011 | Rault et al. |
| 2011/0246850 A1 | 10/2011 | Rault et al. |
| 2011/0276738 A1* | 11/2011 | Kim et al. ...................... 710/300 |
| 2011/0314198 A1* | 12/2011 | Liu et al. ........................ 710/260 |
| 2012/0059961 A1* | 3/2012 | Hershberger et al. ......... 710/107 |
| 2012/0131247 A1* | 5/2012 | Mok .............................. 710/110 |
| 2012/0201332 A1 | 8/2012 | Vapillon |
| 2013/0138841 A1* | 5/2013 | Xu et al. ......................... 710/26 |
| 2013/0205054 A1* | 8/2013 | Wright .......................... 710/105 |

OTHER PUBLICATIONS

ETSI, Draft ETSI EN 302 307, "Digital Video Broadcasting (DVB); Second generation framing structure, channel coding and modulation systems for Broadcasting, Interactive Services, News Gathering and other broadband satellite applications," V1.2.1, Aug. 2009, 78 pages.

MICRONAS, "DRX 3960A Digital Receiver Front-End," Feb. 8, 2001, pp. 1-30.

NXP, "TDA 8295 Digital Global Standard Low IF Demodulator for Analog TV and FM Radio," Feb. 4, 2008, pp. 1-77.

Xceive, "Welcome to Xceive at CES 2007, Upgrade Your Tuner! Get XC5000," 2007, pp. 1-28.

Xceive, "XC5000 Product Brief," Dec. 2006, pp. 1-2.

* cited by examiner

416

| 7 | 6 | 5 | 4 | 3 | 2 | 1 | 0 |
|---|---|---|---|---|---|---|---|
| Start | ADD_OFF | ADDS_SIZE | | PSS_SIZW | | | PARITY |
| 416a | 416b | 416c | | 416d | | | 416e |

| 7 | 6 | 5 | 4 | 3 | 2 | 1 | 0 |
|---|---|---|---|---|---|---|---|
| | SPI_CONF_DATA | | | SPI_CONF_CLK | | | |
| SPI_PBL_KEY | | | | | | | |
| | | | | SPI_PBL_NUM | | | |
| | | | | | | | SPI_EN |

PROVIDING A SERIAL DOWNLOAD PATH TO DEVICES

BACKGROUND

Many different types of semiconductor devices include processing engines that execute instructions. Often times these engines execute instructions that are of firmware of the device itself and stored in a non-volatile memory.

As one example, broadcast video chips such as tuners and demodulators include processors that execute firmware stored in embedded non-volatile memories. However due to updates, code patches and other code revisions, additional code is downloaded to these chips at power up of a system including the chips to aid in processing. In many systems, this code download takes a relatively long amount of time. Due to the length of download, startup of the system, which can be a computer system, television or other video device, can be delayed. Often times the download occurs via a standard bus such as an industry standard inter-integrated ($I^2C$) bus. This bus has a known protocol that is relatively time consuming in downloading a code patch. Nonetheless, due to its industry standard nature and large installed base, manufacturers of systems maintain this bus as the main bidirectional control interface between various chips in the system.

SUMMARY OF THE INVENTION

According to one aspect, the present invention is directed to a first integrated circuit (IC) including an interface. This interface may include various mechanisms to handle incoming clock and data signals. In an embodiment, the interface includes a first multiplexer to receive a first data signal via a serial peripheral interface (SPI) bus coupled to a first pin of the first IC and a second multiplexer to receive a first clock signal via the SPI bus coupled to a second pin of the first IC and a second clock signal via an inter-integrated circuit ($I^2C$) bus coupled to a third pin of the IC. In addition, the interface may include a decoder to receive the second clock signal and a second data signal via the I2C bus coupled to a fourth pin of the IC.

This decoder causes the first multiplexer to output the first data signal responsive to an enable message for the SPI bus received via the $I^2C$ bus and otherwise to output a predetermined state signal, and to cause the second multiplexer to output the first clock signal responsive to the enable message.

In some implementations, a second IC may be coupled to the first IC, where this second IC includes a SPI decoder to receive the first data signal via a first pin of the second IC and to receive the first clock signal via a second pin of the second IC. The second IC further includes an $I^2C$ decoder to receive the second data signal via a third pin of the second IC and to receive the second clock signal via the second pin of the second IC.

Still further, a third IC including a SPI interface may be present and coupled to at least the first IC to provide the first clock signal and the first data signal to the first IC. Note that this SPI interface of the third IC is not configured to receive a serial data input from the first IC and is further not configured to communicate a chip select signal to the first IC.

Another aspect of the present invention is directed to a method for receiving a SPI enable command on an $I^2C$ bus in at least one video IC coupled to the first IC, sending an acknowledgement on the $I^2C$ bus to the first IC, and responsive to the acknowledgment, receiving a code download on a SPI bus in the at least one video IC. The video IC may perform a checksum on the code download and communicate the checksum to the first IC, responsive to a request for the checksum by the first IC. In turn, the video IC can communicate the code download to a tuner IC via a serial line coupled between the video IC and the tuner IC responsive to the enable message.

A still further aspect is directed to a system having multiple components including a system on a chip (SoC), one or more demodulators, and one or more tuners. The SoC may have a decoder to decode a bitstream received from the demodulator into video data and an $I^2C$ interface and a SPI interface to communicate with the demodulator via an $I^2C$ bus and a SPI bus, respectively. However, a chip select signal of the SPI bus may be unconnected between the SoC and the demodulator.

In turn, the demodulator includes a decoder to receive an enable message for the SPI bus via the $I^2C$ bus and to enable a code download communicated from the SoC via the SPI bus to be output from the demodulator to the tuner. In turn, the tuner receives a radio frequency (RF) signal and downconverts and processes it to provide a second frequency signal to the demodulator for demodulation into the bitstream. This tuner may include a SPI decoder to receive the code download from the SoC via the demodulator on a serial line coupled between the tuner and the demodulator, and to receive a SPI clock signal from the demodulator on an $I^2C$ clock line of the $I^2C$ bus coupled between the tuner and the demodulator.

BRIEF DESCRIPTION OF THE DRAWINGS

FIG. 8 is a block diagram of the information included in an instruction byte in accordance with an embodiment of the present invention.

FIG. 9 is a block diagram of a command communicated in accordance with an embodiment of the present invention.

DETAILED DESCRIPTION

In various embodiments, an additional bus may couple between system components to provide a more efficient transfer mechanism for download of code and other information. Although the scope of the present invention is not limited in this regard, in many embodiments semiconductor devices such as integrated circuits (ICs) including video ICs (among others) may couple to a main system processor such as a system-on-chip (SoC) via a control interface that is implemented using an $I^2C$ bus. As detailed above, due to the complicated protocol of this bus, reduced communication speeds occur. Accordingly in various embodiments, an additional bus, which in an embodiment can be another industry standard bus such as a serial peripheral interface (SPI) bus, may also be coupled between at least certain system components to enable high speed communication of code downloads and other information, e.g., under control of communications occurring on the I²C bus.

Furthermore, to reduce impact on systems, embodiments may provide this additional serial bus in a modified manner. For example, the normally bidirectional SPI bus may be implemented in a single direction to reduce the need for greater amounts of pins. Furthermore, in some embodiments reduced connections of this SPI bus can occur between at least some of the separate ICs, e.g., by sharing a clock line and clock pin with the I²C bus to reduce chip real estate consumption. In addition, in some embodiments mechanisms may be provided to reduce noise by isolating communications to at least certain chips, e.g., during radio frequency (RF) communications.

Figure 1:
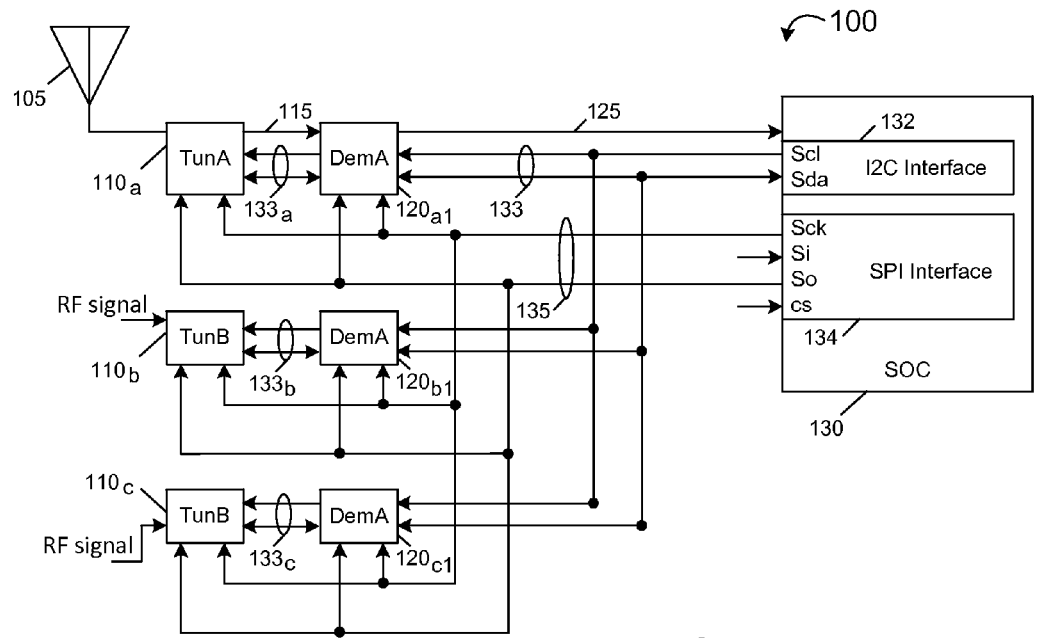
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may be a television such as a high definition television, set-top box, digital video recorder or other video processing system. As seen, incoming RF signals received via an antenna 105 may be provided to a tuner $110_a$, which in an embodiment may be a single die RF IC including circuitry to receive and process the incoming RF signal. In general, tuner $110_a$ may include analog front end components such as amplifiers, gain control devices, mixers, filters and so forth to receive, downconvert and process the RF signal to obtain a lower frequency signal (e.g., an intermediate frequency (IF) such as an IF signal or low IF signal, or a baseband signal) which can be provided via a signal path 115 to a separate IC, namely a demodulator $120_{a1}$ which can perform, e.g., digitization and digital processing including digital demodulation on the digitized processed signals to thus obtain a demodulated bit stream that in turn can be provided via a signal path 125 to a processor 130 such as an SoC. In various embodiments, processor 130 may be an application processor that includes a video processor such as a MPEG decoder to decode an incoming MPEG bit stream received from demodulator $120_{a1}$.

Note that after processing in processor 130, the decoded video information may be provided to an appropriate sink device such as a display of the system, a storage device or so forth (not shown for ease of illustration in FIG. 1). The view of FIG. 1 thus shows a high level view of a video signal processing path from a received signal via antenna 105 through its processing in processor 130 and its eventual output to a given destination. Of course, understand that in other embodiments other types of signal processing paths such as audio or data paths may instead be present.

Note that FIG. 1 further shows the presence of additional video signal processing paths, namely a path including a tuner $110_b$ and configured to receive an RF signal input, e.g., via an over-the-air antenna connection, and that in turn is coupled to a second demodulator $120_{b1}$ which in an embodiment may be of the same configuration as demodulator $120_{a1}$. And further a third video signal processing path includes a tuner $110_c$ that may be coupled to yet a different source of RF signals, e.g., a cable connection that in turn is coupled to a demodulator $120_{c1}$, which again may be configured the same as demodulator $120_{a1}$. For ease of illustration the signal paths between these tuners, demodulators, and the SoC are not shown so as to not obscure other details shown.

Assume that tuner $110_a$ is configured for processing broadcast signals, e.g., according to a given satellite broadcast specification such as DVB-S or DVB-S2, received via antenna 105, tuner $110_b$ is configured to receive and process broadcast signals received via a terrestrial broadcast standard such as DVB-T or DVB-T2, while third tuner $110_c$ may be configured to receive and process signals according to yet another video specification, e.g., a cable connection such as in accordance with a DVB-C standard. Of course understand that the scope of the present invention is not limited to these standards and the various tuners may be configured to handle other types of signals. The same RF signal source (e.g., antenna or cable connection) can also feed all the tuners for watch and record or picture in picture functionalities. Still further understand that in a given implementation more or fewer signal processing paths may be present. And in certain implementations, instead of separate tuner and demodulator ICs, it is possible that a single IC may include both a tuner and a demodulator, and in some such embodiments the tuner and demodulator can be implemented on a single semiconductor die. Still further, it is possible that a SoC may perform demodulation operations, and only a tuner may be coupled in front of the SoC. Many other configurations are contemplated, such as multiple tuners coupled to the SoC (without demodulators), and where all or at least one of the tuners may be configured as described herein to receive code updates. Or it is possible for one or more demodulators to be configured as described herein to receive code downloads, although one or more corresponding front end tuners may not be so configured.

For purposes of discussion here, various control and communication lines are further discussed. Specifically, FIG. 1 shows details of multiple serial paths between processor 130 and ICs $110_a$ and $120_{a1}$. In FIG. 1, processor 130 may be a master of the system with respect to providing control communications to the video ICs. To this end, processor 130 may include a first serial interface 132 and a second serial interface 134, each configured to communicate and receive serial communications. Note that while in the embodiment shown in FIG. 1, these interfaces are shown as being coupled to the various video ICs, understand that in a given system these same serial interfaces may be coupled to many other system components (not shown for ease of illustration in FIG. 1) in that these buses may be multi-drop serial communication buses. In the embodiment shown, first serial interface 132 may be an I²C interface while second serial interface 134 may be a SPI interface.

In the embodiment shown in FIG. 1, I²C interface 132 may couple to each of the video ICs, namely tuners $110_a$-$110_c$ and demodulators $120_{a1}$-$120_{c1}$ via an I²C bus 133 including a data line and a clock line. In general, this I²C bus may be used to communicate control information in a downstream direction from processor 130 to the video ICs. Furthermore, in an upstream direction, the video ICs may communicate various information including status information, such as information responsive to requests by a processor and so forth or low data rate payload service information.

More specifically, I²C interface 132 may be used to communicate a clock signal (SCL) and a data signal (SDA). In general, when I²C clock stretching is not required, the clock signal may be communicated in a single direction from processor 130 to the video ICs, while information can be communicated in a bidirectional manner via the data line. Note also that inter-IC I²C buses $133_a$, $133_b$ and $133_c$ may couple between each pair of tuner and demodulator ICs.

Similarly, SPI interface 134 may couple to each of the video ICs, namely tuners $110_a$-$110_c$ and demodulators $120_{a1}$-$120_{c1}$ via a SPI bus 135 including a data line and a clock line. SPI interface 134 may be used to communicate a SPI clock signal (SCK) and a SPI data signal (SO). In general, for a SPI bus in accordance with an embodiment of the present invention, both the clock signal and the data signal may be communicated in a single direction from processor 130 to the video ICs. For purposes of providing code downloads and other information in the downstream direction, note that a chip select line and a serial data input line (CS and SI, respectively) of the SPI interface may be unconnected (at least for communication with the devices shown in FIG. 1).

By adding the additional SPI bus to multiple additional ICs (e.g., including at least one tuner and one demodulator and potentially multiple sets of tuner and demodulator pairs), unwanted coupling of signals may occur which can undesirably affect receipt and processing of RF signals in the various signal processing paths. Accordingly, in some embodiments the SPI stream communicated on the SPI bus can be gated within an upstream IC such that communications are only passed to a downstream IC as appropriate to reduce the effects of coupling.

Figure 2:
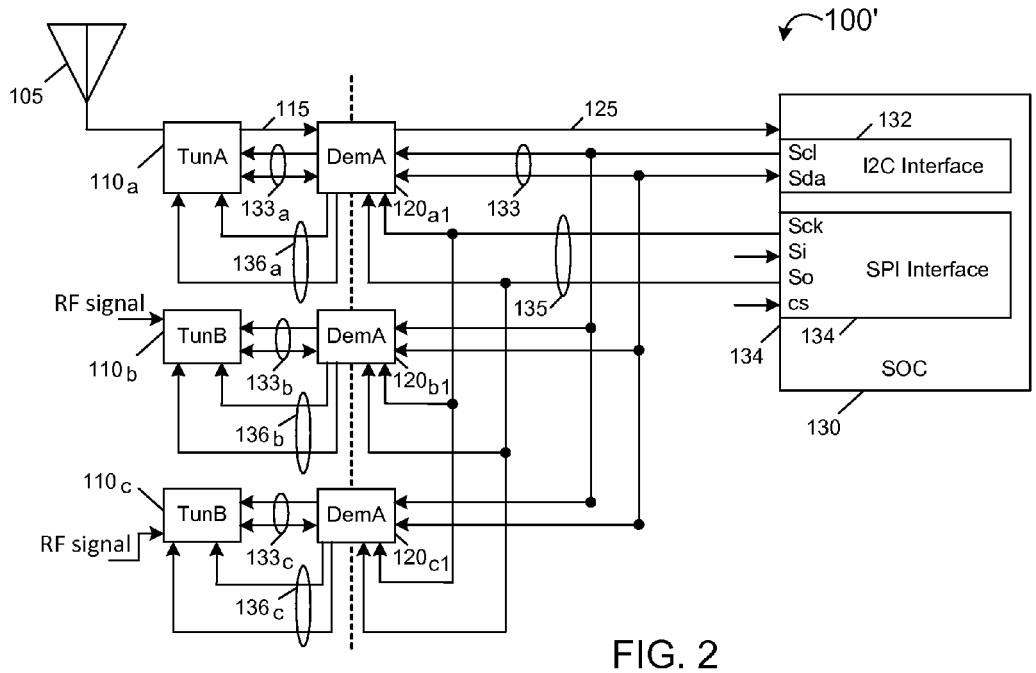
FIG. 2 is a block diagram of an implementation of a system in accordance with another embodiment of the present invention.

Referring now to FIG. 2, shown is a block diagram of an implementation of a system in accordance with another embodiment of the present invention. As shown in FIG. 2, system 100' may be configured in generally the same manner as system 100. However, note that in the embodiment of FIG. 2, each of the demodulators $120_{a1}$-$120_{c1}$ acts as a gate of the SPI communications such that each demodulator can independently act as a master with respect to the downstream communications, e.g., originating from SoC 130 to a corresponding one of tuners $110_a$-$110_c$. In this way, undesired coupling from signals communicated on the SPI bus can be avoided when gated within a given demodulator. To effect this arrangement, note that two additional pins may be consumed on the demodulator. As one example, these pins may be implemented using one or more general purpose 10 (GPIO) pins. More specifically as shown in FIG. 2, separate SPI buses $136_a$-$136_c$ may be coupled between each tuner-demodulator pair. While this additional usage of pins may be accommodated within a given demodulator, it is possible that a tuner, which inherently has a fewer number of available pins, may not have sufficient pins to receive the extra signals for the SPI bus. To this end, embodiments may further provide an arrangement to enable sharing of signal lines (and corresponding pins) between serial buses.

Figure 3:
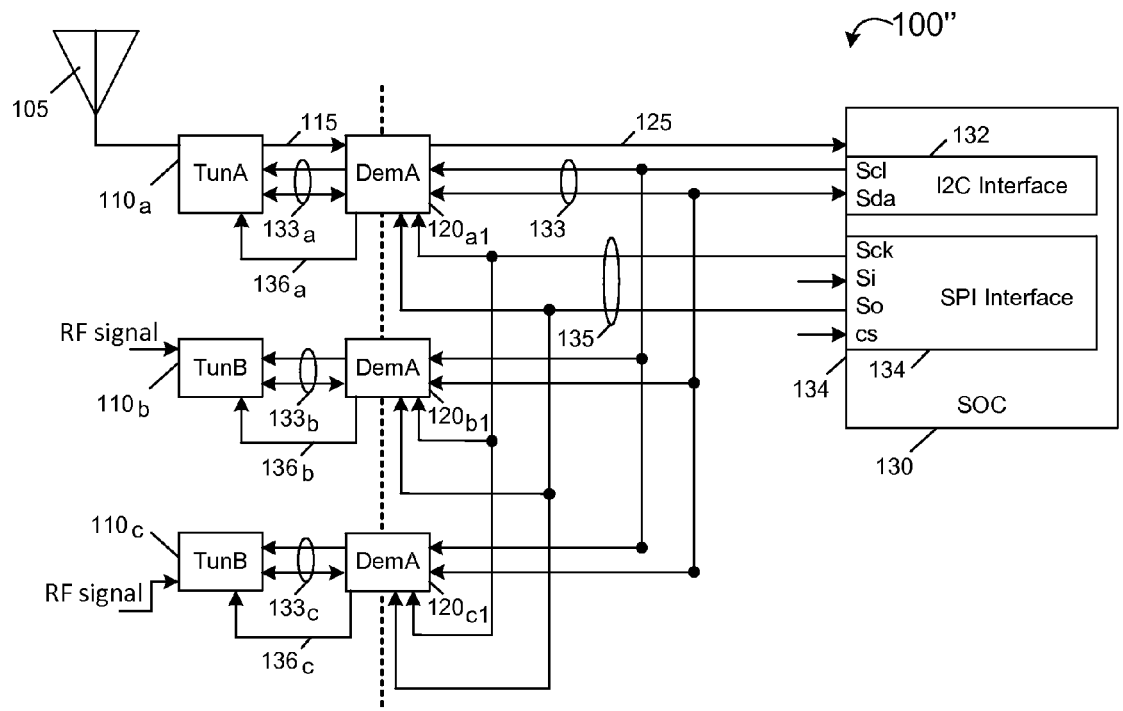
FIG. 3 is a block diagram of a system in accordance with yet another embodiment of the present invention.

Specifically, referring now to FIG. 3, shown is a block diagram of a system in accordance with yet another embodiment of the present invention. As shown in FIG. 3, system 100" may be arranged substantially the same as discussed above as to system 100' in FIG. 2. However here note that only a single additional pin and line is coupled between the pairs of tuners and demodulators. In this embodiment this single line ($136_a$-$136_c$) may be a serial data line corresponding to the SDO line of the SPI bus. However, a clock signal for the SPI bus can be shared or multiplexed with a clock signal for the I²C bus and thus may communicate on the clock line of the inter-IC I²C bus 133.

Figure 4:
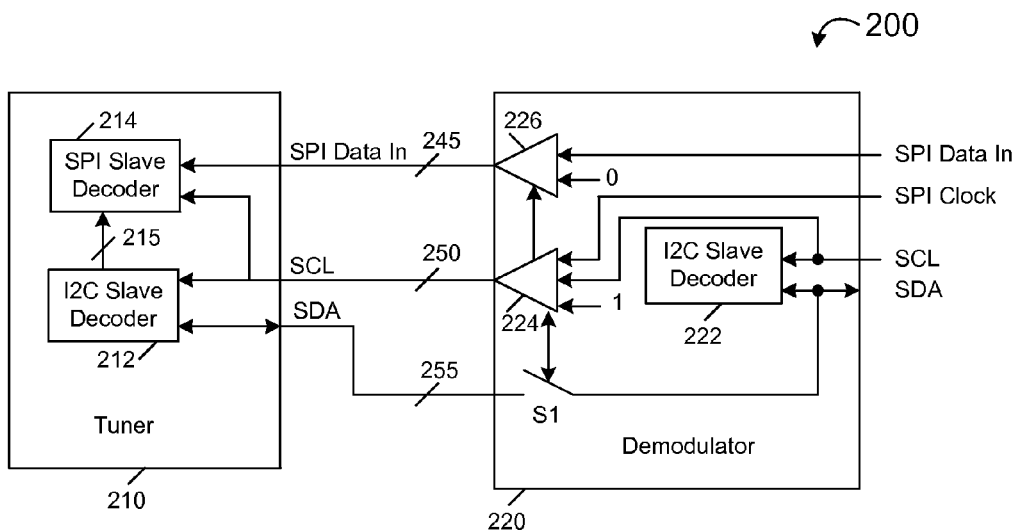
FIG. 4 is a block diagram of further details of a portion of a system in accordance with an embodiment of the present invention.

Referring now to FIG. 4, shown is a block diagram of further details of a portion of a system in accordance with an embodiment of the present invention are shown. System 200 includes a tuner IC 210 coupled to a demodulator IC 220. In various embodiments, each IC may be a stand alone chip such as discussed above with regard to FIGS. 1-3. As seen, tuner 210 includes an I²C slave decoder 212 and SPI slave decoder 214. Of course various other circuitry is present within the tuner, namely the signal processing path of the chip which may include an analog front end to receive incoming RF signals and process and downconvert them to a lower frequency and provide them to demodulator 220 via a separate signal path (not shown for ease of illustration in FIG. 4).

In turn, demodulator 220 includes an I²C slave decoder 222. Although not shown, understand the demodulator may also include a SPI decoder and other circuitry. Instead, the illustrated portion of demodulator 220 may generally include switch control circuitry used to isolate communications such that the I²C bus (and the SPI bus) is active only when an access is needed. In addition, demodulator 220 may include a switch S1 that can be used to disable serial-based communications to avoid noise impact on tuner 210. Thus during RF activities, e.g., reception and processing of RF signals in tuner 210, switch S1 may disable serial data from being communicated on the I²C bus. In addition, the clock signal and the SPI data signal can be disabled or repurposed to carry other signals needed in normal operation.

In the embodiment shown in FIG. 4, a signal line 245 may be a SPI data connection between demodulator 220 and tuner 210 to thus provide downstream data to SPI slave decoder 214 of tuner 210. In turn, a clock signal line 250 may be coupled between demodulator 220 and tuner 210. Clock signal line 250 may communicate a selected clock signal, either a SCL clock signal of the I²C bus or a SPI clock signal of the SPI bus, depending on control within demodulator 220. Still further, an additional data signal line 255 may couple between demodulator 220 and tuner 210. This serial data line may communicate serial data of the I²C bus, as controlled within demodulator 220, described further herein. Collectively, lines 250 and 255 may form an I²C bus between the decoders.

In general, the I²C bus may be used to pass information used to control communications on the SPI bus. More specifically, owing to the lack of a separate chip select signal for the SPI bus, a command communication may be sent from an upstream source (e.g., an SoC or other application processor) to demodulator 220 on the I²C bus such that it is received within I²C decoder 222. Responsive to decoding of this command communication within this decoder, the control of whether a SPI clock signal or an I²C clock signal is communicated on clock signal line 250 may occur. More specifically, the signal to be communicated on this clock signal line may be controlled by a multiplexer 224. Although described herein as a multiplexer, note that in various implementations, both a selection element such as a multiplexer and a buffer may be present to enable compliance with appropriate electrical signaling requirements. More specifically, responsive to this command to enable the SPI bus, decoder 222 will instruct multiplexer 224 to communicate the SPI clock signal on clock signal line 250.

Similarly, I²C decoder 222 may further control the enabling or disabling of communications on the I²C bus to the tuner to thus reduce noise effects. Specifically, decoder 222 may generate a control signal to cause switch S1 to open, thus disabling output on data signal line 255 and further controlling both multiplexers 224 and 226 appropriately. This control may be effected directly by I²C registers in decoder 222 or indirectly from them by an embedded processor of the demodulator (not shown for ease of illustration in FIG. 4). In an embodiment, during this quiet mode of operation, multiplexer 224 may be configured to communicate a steady state signal of a predetermined value (e.g., a logic one) on clock signal line 250. And in turn, multiplexer 226 may be controlled to communicate a steady state signal of a predetermined value (e.g., a logic zero) on SPI data line 245. Thus using an arrangement such as in FIG. 4, complete network compatibility with I²C legacy operation can be realized while sharing a clock signal between I²C and SPI buses. As such, only a single additional data line may couple between demodulator 220 and tuner 210 and only a single additional pin is consumed in tuner 210. In some embodiments, this additional pin can be accommodated or shared with an existing GPIO pin of the chip. As one example, a SPI line coupled between a demodulator and a tuner may reuse a given control line, such as a flag signal line that is only used during normal operation for a specific operation such as a freeze mode control signal, to communicate the serial data such as a code download from a demodulator to a tuner. Other connections can be used to provide for a pass through mode, e.g., of a clock line such that a single clock line coupled between demodulator and tuner can pass both an I²C clock signal and a SPI clock signal, and the tuner can provide the received clock signal to both an internal I²C and SPI decoder.

Still further, using an implementation as in FIG. 4, the I²C bus may act to emulate a chip select signal for the SPI bus, and via decoder 222, SPI transfers to tuner 210 may be gated responsive to communication on the I²C bus.

Figure 5:
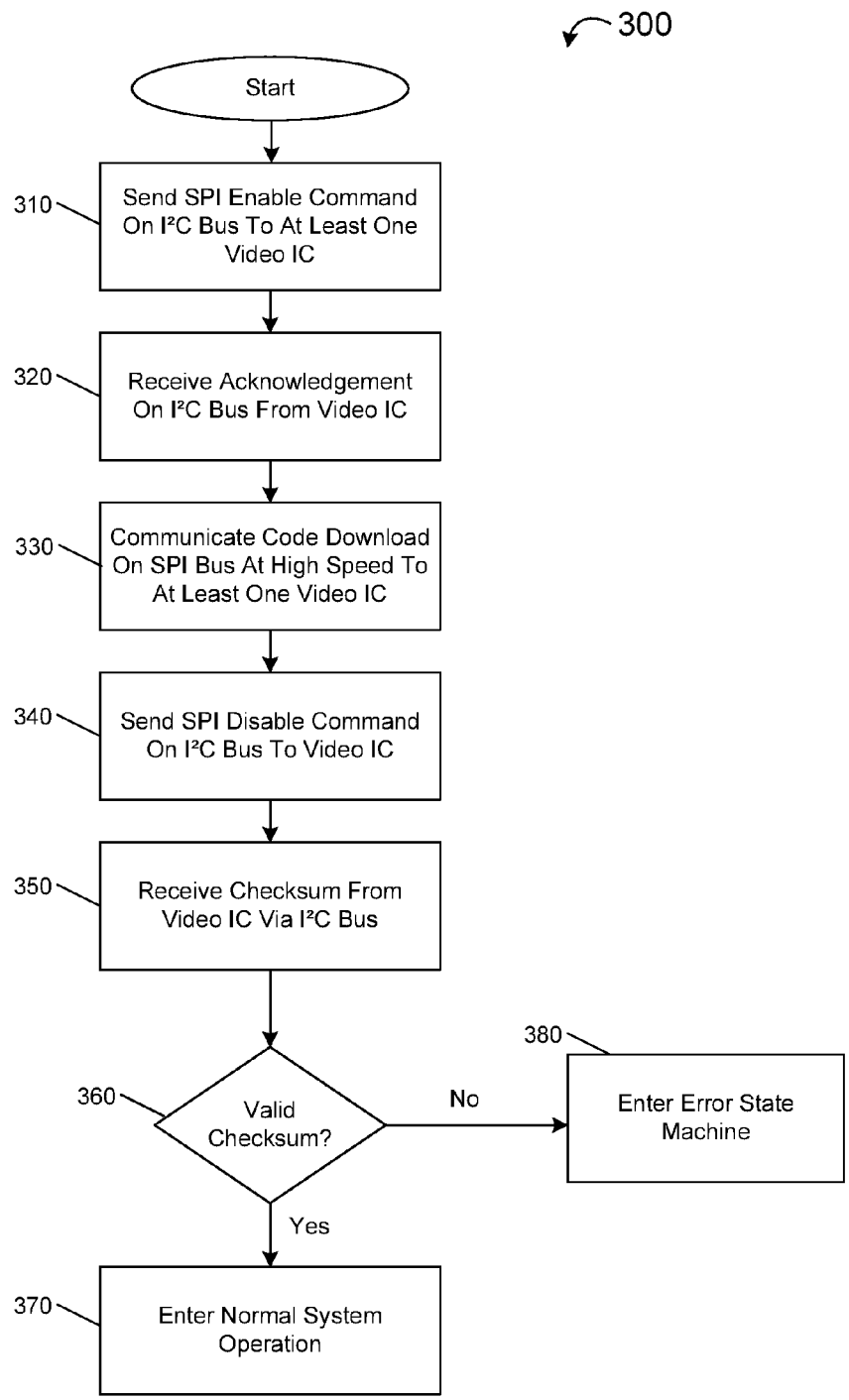
FIG. 5 is a flow diagram of a method for performing code downloads in accordance with an embodiment of the present invention.

Referring now to FIG. 5, shown is a flow diagram of a method for performing code downloads in accordance with an embodiment of the present invention. As shown in FIG. 5, method 300 may be performed by a SoC or other application processor that seeks to download code in an efficient manner to one or more ICs downstream of the processor. For purposes of discussion herein, assume that the code corresponds to some or all of the firmware for these chips. In the discussion herein, assume an arrangement such as one of FIGS. 1-3 where a SoC is to download one or more code patches or memory images to multiple tuners and demodulators, some of which can be common instantiations of a single design.

Method 300 of FIG. 5 thus may be used to communicate a single image to one or more downstream devices. As seen, method 300 may begin by sending a SPI enable command on an I²C bus to at least one video IC (block 310). In an embodiment, this SPI enable command may thus cause a demodulator to receive and decode this command to thus enable powering up and configuration of a SPI interface. Note that depending upon the command, the SPI interface of only the demodulator may be configured and powered up, or an additional communication from the demodulator to a paired tuner may occur to enable a SPI interface of that IC to also be configured and enabled in an instance in which the code download is to be directed to this tuner IC. In this case, a three step process occurs. First the demodulator I²C pass-through is enabled with a specific I²C command to the demodulator. Then the I²C SPI enable command is sent to the tuner. Then a specific I²C command is sent to the demodulator to enable the SPI pass-through to the tuner. At this point, the tuner is ready to receive a SPI stream.

Referring still to FIG. 5, next the SoC can receive an acknowledgement on the I²C bus from the video IC indicating successful receipt of the message and the configuration operations described above (block 320). Responsive to this communication, control passes to block 330 where a code download can be communicated on the SPI bus. More specifically, this download can occur at high speeds, e.g., at speeds up to tens of megabits per second (Mbps) to enable a code download to occur efficiently to a selected destination e.g., one or more video ICs (block 330). Note that this communication may be a bulk communication sent with a protocol that does not require acknowledgements, details of which will be described further below.

After such communication, a SPI disable command can be sent on the I²C bus to the video IC to thus cause one or more SPI interfaces to be disabled (block 340). Next, the SoC may request and receive a checksum from the video IC via the I²C bus (block 350). This checksum may thus correspond to a result of a checksum operation performed on the received code download. Control next passes to diamond 360 to determine whether the checksum is valid. If so, control passes to block 370 where normal system operation may be entered and accordingly, no further communications may occur on the SPI bus, unless an additional code download is later indicated.

If a valid checksum is not determined, control passes instead to block 380 where an error state can be entered. As an example, an error state machine within the SoC can be enabled to determine the type of error and take appropriate corrective action. Although shown at this high level in the embodiment of FIG. 5, understand the scope of the present invention is not limited in this regard.

Figure 6:
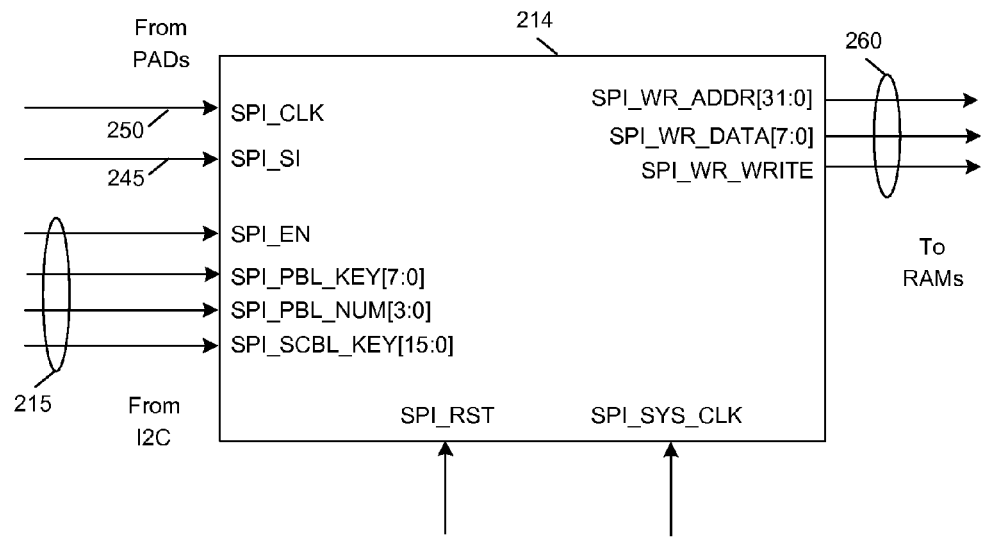
FIG. 6 is a block diagram of a SPI decoder in accordance with an embodiment of the present invention.

Referring now to FIG. 6, shown is a block diagram of a SPI decoder in accordance with an embodiment of the present invention. In the embodiment shown in FIG. 6, SPI decoder 214 may be configured to receive various signals, both via the SPI bus, namely the SPI clock signal (SPI_CLK) via line 250 and incoming serial data (SPI_SI) via signal line 245. In addition, SPI decoder 214 further receives an enable signal (SPI_EN).

In addition, various control information to set up the SPI decoder for receipt and handling of an incoming SPI message may be received from an I²C decoder via signal lines 215. Thus these signals are communicated on the I²C bus from the demodulator to the tuner, and then I²C slave decoder 212 parses the information and sends the commands to SPI decoder 214. Specifically, these signals can include certain preamble key and number signals (SPI_PBL_Key [7:0] and SPI_PBL_NUM [3:0]) and additional key signal (SPI_S-CBL_KEY [15:0]). In addition, SPI decoder 214 runs out of an incoming chip reset and system clock signal (namely, SPI_RST and SPI_SYS_CLK).

Responsive to configuring this decoder for decoding incoming configuration information received the I²C decoder, when SPI data, e.g., corresponding to code updates or so forth are received, they can be communicated to a given memory of the device, e.g., via output lines 260, which include address lines SPI_WR_ADDR [31:0] and data lines SPI_WR_Data [7:0], which can be caused to be written into the given memory (such as a random access memory) of the device via a write enable signal communicated via a write enable line SPI_WR_Write.

Figure 7:
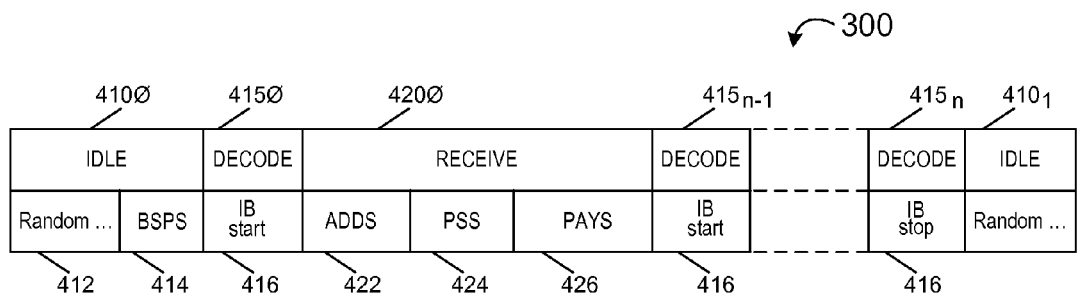
FIG. 7 is a block diagram of a communication frame in accordance with an embodiment of the present invention.

Referring now to FIG. 7, shown is a block diagram of a SPI communication frame in accordance with an embodiment of the present invention. As shown in FIG. 7, frame 400 may include multiple portions or states including: an idle state 410 which may be a wait state in which a preamble is waited for; a decode state 415 in which an instruction is decoded; and a receive state 420 in which various information is received. In general, a data frame may be formatted to include a bit synchronization preamble sequence referred to as a BSPS; a command byte referred to as an instruction byte (IB); an address index sequence referred to as ADDS; an optional payload size sequence referred to as PSS; and a payload sequence referred to as PAYS.

Thus as seen in FIG. 7, frame 400 includes an idle state $410_0$, one or more decode states $415_0$-$415_n$, and associated receive state like $420_0$. As further seen, an idle state $410_0$ includes a random portion 312 in which random information may be communicated, and a BSPS portion 414, which communicates the bit synchronization preamble sequence. Thereafter, a decode state $415_0$ occurs and provides an instruction byte 416, which as will be described below communicates a start instruction.

Next, a receive state $420_0$ occurs that includes an address portion 422 to provide the address index sequence, an optional payload size sequence portion 424 to provide the PSS, and a payload sequence 426 that includes the information of the message. Note that a message may be segmented into multiple receive states. Thus as shown in FIG. 7, another decode state 415$_{n-1}$ is communicated that includes an additional instruction byte 416. At a conclusion of a message frame, a final decode state 415$_n$ may be communicated that includes an instruction byte that indicates a stop to the message. Thereafter an idle state 410$_1$ may again be entered, e.g., for another frame. Although shown at this high level in the embodiment of FIG. 7, understand the scope of the present invention is not limited in this regard.

Note that because embodiments avoid the need for a chip select signal from the conventional SPI bus, a synchronous relationship between this CS signal and the SPI clock signal is lost. Accordingly, a corresponding emulation of this chip select signal from an I²C clock domain occurs asynchronously. To this end, the bit synchronization mechanism may be provided. In various embodiments, this synchronization mechanism may be realized by enabling the SPI decoder to detect a certain number of consecutive bytes, having a predetermined value programmable by a register, e.g., in one embodiment having a default value of 0xAA. This byte value may be communicated to the SPI decoder via the SPI_PBL_Key [7:0] signals. Furthermore, the number of consecutive occurrences of this byte communication may also be programmable. In an embodiment, this consecutive sequence may be between 1 and 16 byte sequences. In an embodiment, a default value of 0 may indicate that only a single occurrence is communicated. This number of consecutive occurrences can be communicated via the SPI_PBL_NUM [3:0] signals. Note that this bit synchronization preamble may only act to synchronize the hardware state machine of the SPI decoder when in the idle state, such that a portion of a payload equal to this bit synchronization preamble does not cause a resynchronization of the frame.

Next referring to FIG. 8, shown is a block diagram of the information included in an instruction byte in accordance with an embodiment of the present invention. As shown in FIG. 8, instruction byte 416 includes a plurality of segments 416$_a$-416$_e$. In the implementation shown, segment 416$_a$ is a start bit, segment 416$_b$ is an address offset indication, 416$_c$ is an address size indicator, 416$_d$ is a payload size indicator, and 416$_e$ is a parity indicator. In an embodiment, the values of these segments of the instruction byte may be in accordance with Table 1 below. Although shown with these particular portions and values (and order) in the embodiment of FIG. 8, understand the scope of the present invention is not limited in this regard.

TABLE 1

Start

1: START: flag beginning of a valid instruction
0: STOP: flag the end of the frame.
Add_Off 1: OFFSET: The value in the ADDS is a positive increment to the current absolute address.
0: ABSOLUTE : The value in the ADDS is the absolute address to write to.
Add_Size 0: The address index sequence ADDS is 1 byte
1: The address index sequence ADDS is 2 bytes
2: The address index sequence ADDS is 4 bytes
3: spare TABLE 1-continued PSS_Size 0: NO payload size sequence PSS. PAYS is 1 byte.
1: NO payload size sequence PSS. PAYS is 2 bytes.
2: NO payload size sequence PSS. PAYS is 4 bytes.
3: NO payload size sequence PSS. PAYS is 8 bytes.
4: NO payload size sequence PSS. PAYS is 16 bytes.
5: PSS is 1 byte and carry the PAYS size.
6: PSS is 2 bytes and carry the PAYS size.
7: PSS is 4 bytes and carry the PAYS size.
Parity Even parity bit. If the total number of ones in the all byte is not even.
The instruction is equivalent to a STOP Referring now to FIG. 9, shown is a block diagram of a command communicated via the I²C interface to enable setting up of a SPI bus and decoder within a receiving device to enable receipt of a SPI bus communication in accordance with an embodiment of the present invention.

As shown in FIG. 9, message 430 may include various fields including a configuration data field, a configuration clock field, the preamble key and number fields, described above as well as a SPI enable field. In an embodiment, SPI_CONF_DATA provides SPI data input pin selection and in a default state does not configure anything; SPI_CONF_CLK provides SPI clock input pin selection, which selects the pin to be used as the clock input, and in a default state should not configure anything; and the SCI_PBL_KEY and SCL_PBL_NUM fields including the preamble key and number fields described above.

Given that the various operations to provide communications on a SPI bus controlled by an I²C bus may be realized by logic, decoders and so forth, it is to be understood that such logic and/or decoders may execute instructions stored in an article in the form of a non-transitory computer-readable storage medium onto which various instructions are written. These instructions may enable the various logic and decoders to perform I²C bus-controlled communications on a SPI bus as described herein.

Figure 10:
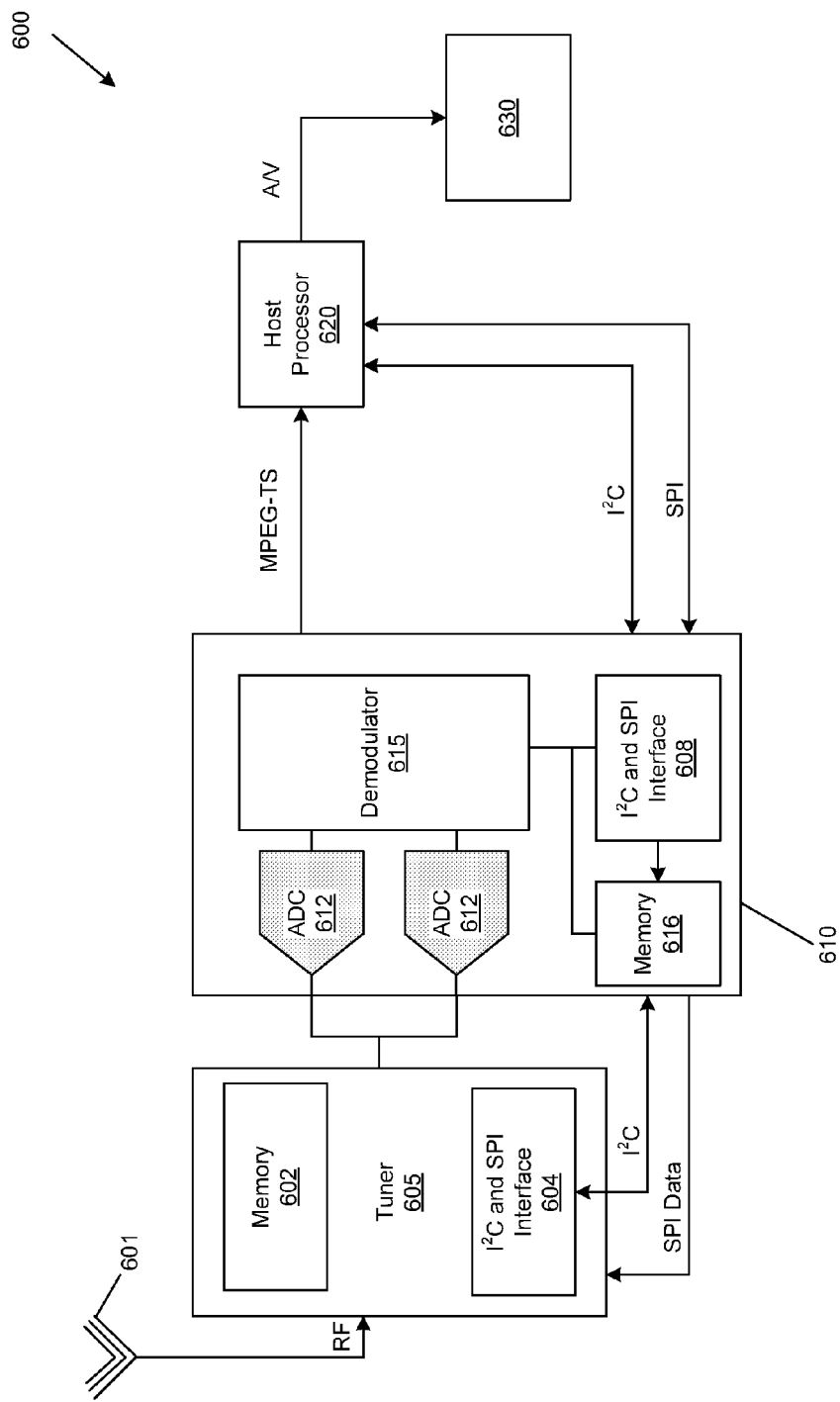
FIG. 10 is a block diagram of a system in accordance with one embodiment of the present invention.

Embodiments may be implemented in many different system types, such as set-top boxes, high definition or standard digital televisions, and so forth. Some applications may be implemented in a mixed signal circuit that includes both analog and digital circuitry. Referring now to FIG. 10, shown is a block diagram of a system in accordance with one embodiment of the present invention. As shown in FIG. 10, system 600 may include a television that is coupled to receive a RF signal from an antenna source 601 such as an over-the-air antenna. However, in other embodiments, the original source may be cable distribution, satellite, or other source that is then redistributed through a digital terrestrial network. The incoming RF signal may be provided to a tuner 605 which may be, in one embodiment a single-chip tuner. As seen, tuner 605 may include a memory 602 to store executable instructions and an interface 604 which may include both I²C and SPI interface circuitry.

The incoming RF signal is provided to tuner 605 for tuning to a desired signal channel. While the scope of the present invention is not limited in this regard, tuner 605 may include various circuitry. For example, in one embodiment tuner 605 may include a bandpass filter having an output coupled to a low noise amplifier (LNA) to receive and amplify the RF signal. The output of the LNA may be provided to another bandpass that in turn is coupled to a mixer. In turn, the mixer downconverts the incoming RF signal to an IF output, which may be communicated via a signal processing path to a demodulator 610, for digitization by an analog-to-digital converter (ADC) 612.

Referring still to FIG. 10, the digitized output of ADC 612 may be provided to additional processing circuitry including a demodulator circuit 615. As further seen, demodulator 610 includes an interface 608 that includes an I²C and SPI interface circuitry. In addition, a demodulator can include a memory 616 that can store executable instructions, as described above. Memories 602 and 616 may receive and store code updates in accordance with an embodiment of the present invention, via the combined I²C and SPI mechanism discussed herein.

The output of demodulator 615 may correspond to a transport stream such as an MPEG-TS that is provided to a host processor 620 for further processing into an audio visual signal that may be provided to a display 630, such as a computer monitor, flat panel television or other such display. Note further, control channels which may be in accordance with I²C and SPI communication paths may be present between host processor 620 and demodulator 610. To provide further downloading of code updates or other information in a downstream direction to tuner 605, note the presence of an I²C bus between demodulator 610 and tuner 605. Furthermore, note the presence of a single serial data line, namely SPI Data, to enable download of code updates for storage in memory 602 of the tuner (for example).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first integrated circuit (IC) including an interface having:
   a first multiplexer to receive a first data signal via a serial peripheral interface (SPI) bus coupled to a first pin of the first IC;
   a second multiplexer to receive a first clock signal via the SPI bus coupled to a second pin of the first IC and a second clock signal via an inter-integrated circuit (I²C) bus coupled to a third pin of the first IC; and
   a decoder to receive the second clock signal and a second data signal via the I²C bus coupled to a fourth pin of the first IC, wherein the decoder is to cause the first multiplexer to output the first data signal responsive to an enable message for the SPI bus received via the I²C bus and otherwise to output a predetermined state signal, and to cause the second multiplexer to output the first clock signal responsive to the enable message.

2. The apparatus of claim 1, further comprising a switch to couple the second data signal to an output pin of the first IC.

3. The apparatus of claim 1, further comprising a second IC coupled to the first IC, the second IC including a SPI decoder to receive the first data signal via a first pin of the second IC and to receive the first clock signal via a second pin of the second IC.

4. The apparatus of claim 1, further comprising a third IC including a SPI interface to provide the first clock signal and the first data signal to the first IC, wherein the SPI interface of the third IC is not configured to receive a serial data input from the first IC.

5. The apparatus of claim 2, wherein the decoder is to cause the second multiplexer to output the second clock signal during a data communication on the I²C bus, and to output a second predetermined state signal during receipt of a radio frequency (RF) signal in a second IC coupled to the first IC.

6. The apparatus of claim 3, wherein the second IC further includes an I²C decoder to receive the second data signal via a third pin of the second IC and to receive the second clock signal via the second pin of the second IC.

7. The apparatus of claim 3, wherein the first IC comprises a demodulator and the second IC comprises a tuner.

8. The apparatus of claim 3, wherein communication of the first data signal on the SPI bus is to provide a code patch to at least one of the first IC and the second IC, and otherwise the first multiplexer is to communicate the predetermined state signal.

9. The apparatus of claim 3, wherein the I²C bus is active during RF operation of the first IC, and the SPI bus is disabled during RF operation of the first IC.

10. The apparatus of claim 4, wherein the SPI interface of the third IC is not configured to communicate a chip select signal to the first IC.

11. The apparatus of claim 4, wherein the third IC includes an I²C interface to provide the second data signal and the second clock signal to the first IC, wherein the third IC is to communicate the enable message on the I²C bus to emulate the chip select signal, to cause the first multiplexer of the second IC to output the first data signal.

12. A method comprising:
   receiving, from a first integrated circuit (IC), a serial peripheral interface (SPI) enable command on an inter-integrated circuit (I²C) bus in at least one video IC coupled to the first IC;
   sending, from the at least one video IC, an acknowledgement on the I²C bus to the first IC; and
   responsive to the acknowledgment, receiving, from the first IC, a code download on a SPI bus in the at least one video IC.

13. The method of claim 12, further comprising receiving a SPI disable command on the I²C bus in the at least one video IC after the code download is completed.

14. The method of claim 12, further comprising performing a checksum on the code download in the at least one video IC, and communicating the checksum to the first IC, responsive to a request for the checksum by the first IC.

15. The method of claim 12, further comprising communicating the code download from the at least one video IC to a tuner IC coupled to the at least one video IC, via a serial line coupled between the at least one video IC and the tuner IC responsive to the enable message.

16. The method of claim 12, further comprising receiving the code download in a plurality of demodulators coupled to the first IC.

17. The method of claim 15, further comprising communicating a SPI clock signal from the at least one video IC to the tuner IC, via a clock line of the I²C bus coupled between the at least one video IC and the tuner IC.

18. A system comprising:
   a system on a chip (SoC) including a decoder to decode a bitstream received from a demodulator coupled to the SoC into video data, the SoC further including an inter-integrated circuit (I²C) interface to communicate with the demodulator via a I²C bus, and a serial peripheral interface (SPI) interface to communicate with the demodulator via a SPI bus, wherein a chip select signal of the SPI bus is unconnected between the SoC and the demodulator;
   the demodulator coupled to the SoC to provide the bitstream to the SoC, the demodulator including a decoder to receive an enable message for the SPI bus via the I²C bus and to enable a code download communicated from the SoC via the SPI bus to be output from the demodulator to a tuner; and the tuner coupled to the demodulator to receive a radio frequency (RF) signal and downconvert and process the RF signal to provide a second frequency signal to the demodulator for demodulation into the bitstream, the tuner further including a SPI decoder to receive the code download from the SoC via the demodulator on a serial line coupled between the tuner and the demodulator, and to receive a SPI clock signal from the demodulator on an I$^2$C clock line of the I$^2$C bus coupled between the tuner and the demodulator.

19. The system of claim 18, wherein the demodulator further comprises a first multiplexer to receive the code download via the SPI bus and to output to the code download via a first output pin of the demodulator, and a second multiplexer to receive a SPI clock signal via the SPI bus coupled to a second pin of the demodulator and a I$^2$C clock signal via the I$^2$C bus coupled to a third pin of the IC and to output one of the SPI clock signal and the I$^2$C clock signal via a second output pin of the IC.

20. The system of claim 18, wherein after communication of the code download, the demodulator is to communicate the I$^2$C clock signal on the I$^2$C clock line of the I$^2$C bus coupled between the tuner and the demodulator.

21. The system of claim 18, wherein the demodulator is to disable the I$^2$C bus coupled between the tuner and the demodulator during receipt of RF communications in the tuner.

22. A system comprising:

a system on a chip (SoC) including a decoder to decode incoming information into video data, the SoC further including an inter-integrated circuit (I$^2$C) interface to communicate with a first integrated circuit (IC) via a I$^2$C bus, and a serial peripheral interface (SPI) interface to communicate with the first IC via a SPI bus, wherein a chip select signal of the SPI bus is unconnected between the SoC and the first IC; and the first IC coupled to the SoC to provide the incoming information to the SoC, the first IC including a decoder to receive an enable message for the SPI bus via the I$^2$C bus and to enable a code download communicated from the SoC via the SPI bus to be stored in a storage of the first IC.

23. The system of claim 22, further comprising a first tuner coupled to the first IC to receive a radio frequency (RF) signal and downconvert and process the RF signal to provide a second frequency signal to the first IC for demodulation into the incoming information, the first tuner further including a SPI decoder to receive the code download from the SoC via the first IC on a serial line coupled between the first tuner and the first IC, and to receive a SPI clock signal from the first IC on an I$^2$C clock line of the I$^2$C bus coupled between the first tuner and the first IC.

24. The system of claim 22, wherein the first IC further comprises a first multiplexer to receive the code download via the SPI bus and to output to the code download via a first output pin of the first IC, and a second multiplexer to receive a SPI clock signal via the SPI bus coupled to a second pin of the first IC and a I$^2$C clock signal via the I$^2$C bus coupled to a third pin of the first IC and to output one of the SPI clock signal and the I$^2$C clock signal via a second output of the first IC.

* * * * *